May 20, 1952 A. G. PINTO 2,597,670

TELEPHONE SWITCH HOOK ACTUATOR

Original Filed Feb. 6, 1948 4 Sheets-Sheet 1

INVENTOR.
ARTHUR GOMES PINTO
BY
Zoltan Polachek
ATTORNEY

TELEPHONE SWITCH HOOK ACTUATOR

Original Filed Feb. 6, 1948 4 Sheets-Sheet 2

INVENTOR.
ARTHUR GOMES PINTO
BY
Zoltan Polachek
ATTORNEY

May 20, 1952 A. G. PINTO 2,597,670

TELEPHONE SWITCH HOOK ACTUATOR

Original Filed Feb. 6, 1948 4 Sheets-Sheet 3

INVENTOR.
ARTHUR GOMES PINTO
BY
Zoltan Polachek
ATTORNEY

May 20, 1952 A. G. PINTO 2,597,670

TELEPHONE SWITCH HOOK ACTUATOR

Original Filed Feb. 6, 1948 4 Sheets-Sheet 4

INVENTOR.
ARTHUR GOMES PINTO
BY Zoltan Polachek
ATTORNEY

Patented May 20, 1952

2,597,670

UNITED STATES PATENT OFFICE 2,597,670

TELEPHONE SWITCH HOOK ACTUATOR

Arthur Gomes Pinto, Rio de Janeiro, Brazil

Substituted for application Serial No. 6,746, February 6, 1948. This application May 10, 1951, Serial No. 225,587. In Canada October 4, 1948

3 Claims. (Cl. 179—147)

This invention relates to telephone attachments. This is a substitute for my previous application filed on February 6, 1948, Serial No. 6,746.

More particularly, among the objects of the invention is the provision, in connection with a telephone base-set having a French-type removable hand-set carrying both receiving and transmitting diaphragms, of new and useful improvements whereby the hand-set, instead of resting as usual in the cradle of said base-set, between telephone conversations, is carried by an upstanding and readily adjustable support having no physical connection with the base-set. Nevertheless, in combination with said support, a means is provided, applicable to various dissimilar types of telephone base-sets, which may be clamped to the base-set without having to drill holes in the base-set or change it in any way, and yet which includes an instantaneously flippable cam member for quick adjustment to either of two positions. Said member, when flipped to one of said positions, frees the usual spring-urged switch inside the base-set to open the telephone line, exactly as said switch is freed on ordinarily lifting the hand-set from the base-set cradle; and when said member is thrown to its other position, said switch is forced to close the telephone line, exactly as said switch is operated on ordinarily replacing the hand-set in the base-set cradle.

A feature of the invention, also, is that said attachment of said means to the base-set does not detract at all from the generally ornamental appearance of the base-set, and, indeed, adds to its attractiveness of appearance, and in such a manner that said means is apparently a feature inbuilt into the base-set by the manufacturer thereof.

With such an arrangement as provided by the present invention, a person talking at the telephone always has both hands free, for the writing of memoranda or the like, as the support carrying the hand-set may be adjusted quickly and easily to position the same for proper co-action with both the mouth and an ear of said person while allowing the latter's posture to be one of perfect comfort during even a long conversation.

Another feature of the invention is that said support incorporates, in combination with a main standard which can be variously frictionally set to have any desired substantially universal-angular-adjustment at substantially any point along its length, a novel and valuable mounting for the hand-set including angular adjustment about a plurality of axes each perpendicular to the other, and, in addition, a telescopic device whereby the hand-set may be bodily moved to adjust the same for varying its distance from said mounting.

A feature of the invention, further, is that said support not only is not attached to the receiver, but is also provided with practicable means for conveniently and firmly securing the support at a very advantageous location, as at a marginal portion of a desk or table top.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4, 5, 11:
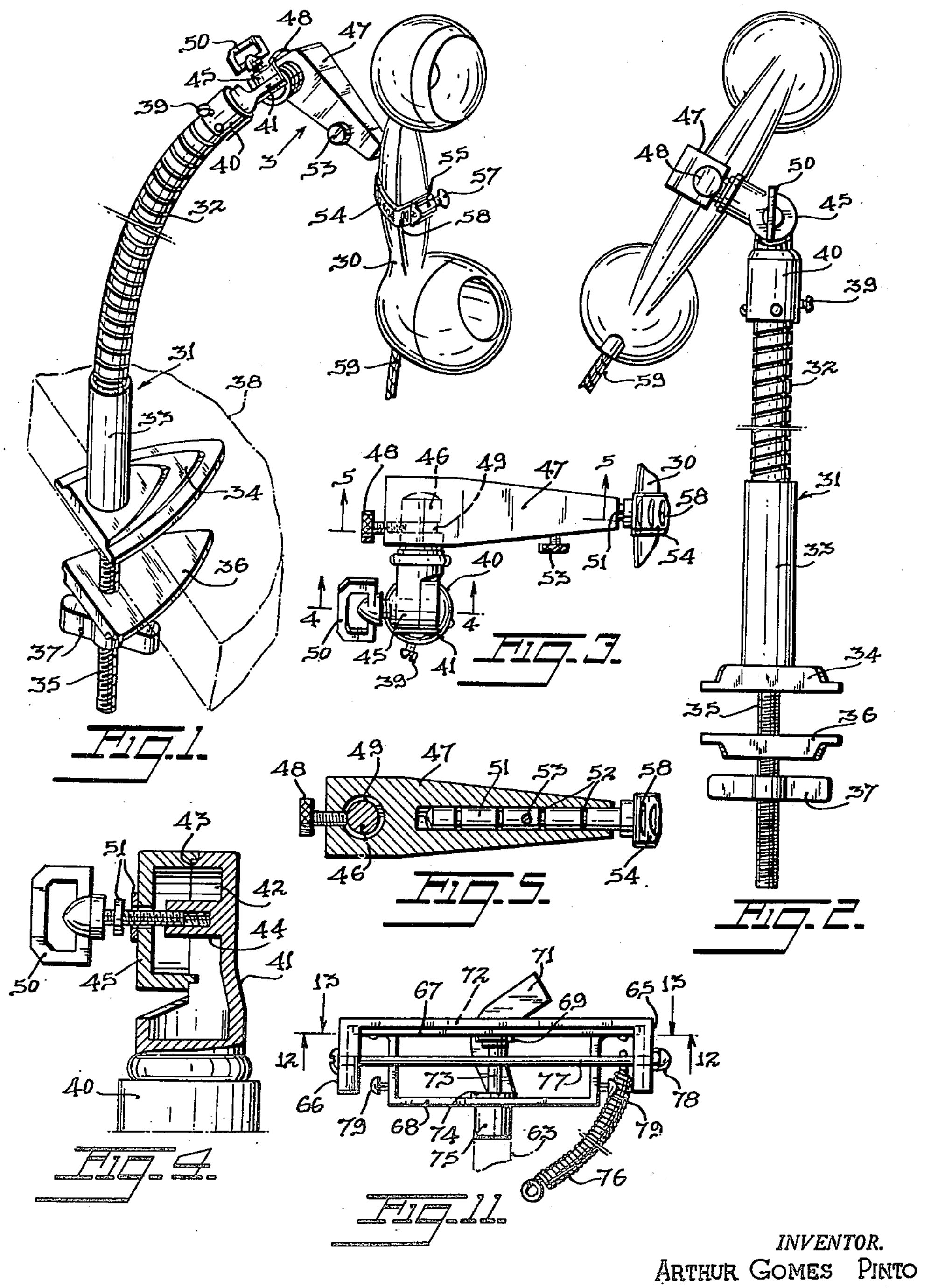
Fig. 1 is a perspective view, showing a now favored embodiment of the support for the telephone hand-set.
Fig. 2 is an elevational view, looking substantially in the direction of the arrow 2 of Fig. 1, with said support detached from the desk or table top fragmentarily indicated in dot and dash lines in Fig. 1.
Fig. 3 is an enlarged detail view in side elevation, looking substantially in the direction of the arrow 3 of Fig. 1.
Fig. 4 is a detail sectional view, taken on the line 4—4 of Fig. 3.
Fig. 5 is a similar view, taken on the line 5—5 of Fig. 3.
Fig. 11 is an end elevation of said means, but with said cam member now in position to close the telephone line.

Referring to the drawings more in detail, and first to Figs. 1–6, the support for the telephone hand-set 30 is shown as including a main standard 31 composed in part of a tube 32 of the well known kind formed of a spirally coiled metal strip edge-interengaged so as to be substantially universally angularly adjustable at substantially any point along its length, and then to remain frictionally retentive of any such adjustment. This tube acts as a covering for a conventional gooseneck within the tube 32.

The lower part of said standard is comprised of a rigid sleeve 33 upstanding from a bracket-plate 34. Suitably fixed in the lower portion of the sleeve 33 and in the plate 34 is a depending threaded rod 35. Loose on said rod is another bracket-plate 36, and spirally adjustable on said rod below said plate 36 is a nut 37. On tightening up the nut, the device may be securely clamped at a marginal portion of a desk or table top 38.

Fast on the upper end of the tube 32, as by a screw 39, is a collar or nipple 40 integrally carrying a cup-like structure 41 providing a recess 42, around the upper zone of which is a shouldered annular rim 43, and arranged centrally of said rim is an integral projection 44 drilled and tapped as shown. Shaped for interfitting with said rim 43 is a shouldered annular rim of a cup 45 integral with a post 46.

Said post 46 is rotatably housed in a recess extending transversely through an arm 47 near one end of the latter, whereby said arm can be angularly adjusted on the post 46. Said post is retained in the arm, and the arm is frictionally held in the desired adjustment, by means of a screw 48 the inner end of which is projected into an annular groove 49 around the post.

For the desired adjustment of the post 46 on the structure 41 at the top of the standard 30, the aforesaid rims are provided, the rim 43 on the structure 41 and the interfitting rim on the cup 45. When the last-named rim has been angularly shifted relative to the rim 43, the parts are secured in the selected adjustment by tightening a screw 50, carrying a pair of washers 51, and having a thread matching the thread in the hole drilled into the projection 44.

Not only are there provided the various adjustments above described, but also a further adjustment is afforded, and this of the hand-set 30 relative to the end of the arm 47 remote from the post 46. Variously endwisely projectable from a deep well-like recess in and along said arm, is a rod 51, having spaced along its length a plurality of annular grooves 52. A set-screw 50 is provided at a suitable point along the length of the arm, for positively holding said rod in a selected degree of protrusion, by entry into one of the grooves 52, or, as indicated in Fig. 5, for tightly frictionally holding the rod in an intermediate adjustment. There is, moreover, a further possible adjustment, which is an adjustment of the collar or nipple 40 angularly around the upper end of the tube 32.

The outer end of the rod 51, at a suitably shaped portion thereof, has secured thereto a flexible metal strip 54 forming with a housing 55 a familiar type of tightenable strap. This type of clamping strap, as is well known, has one end of the strip 54 clinched-clamped at a portion $55^a$ of the housing 55, in back of which portion $55^a$ is a tunnel through the housing. In back of said tunnel is a cylindrical chamber in which a spirally threaded feed-screw 56, having a head 57 by which it may be manually turned, is journalled, in such manner as to prevent endwise movement of said screw. Portions of the thread of the screw project into said tunnel, for coaction with properly shaped and spaced apertures 58 arranged along the tongue end of the strip 54; so that, by insertion of such tongue end into the tunnel, and then turning the screw 56, the strip 54 may be tightened up to form a strap closely embracing the central portion of the hand-set 30 and thus for dependably anchoring the latter on the rod 51.

Thus, with the clamping means 34—37 placed at any convenient location, the hand-set 30 may be arranged at any desired inclination and at any desired position in space, and at a height such that a person may, at any time the telephone is to be used, have the hand-set available for perfect talking and listening, and with both hands free.

In Fig. 2, a part of the wiring between the hand-set 30 and the telephone base-set is indicated at 59.

Figure 7:
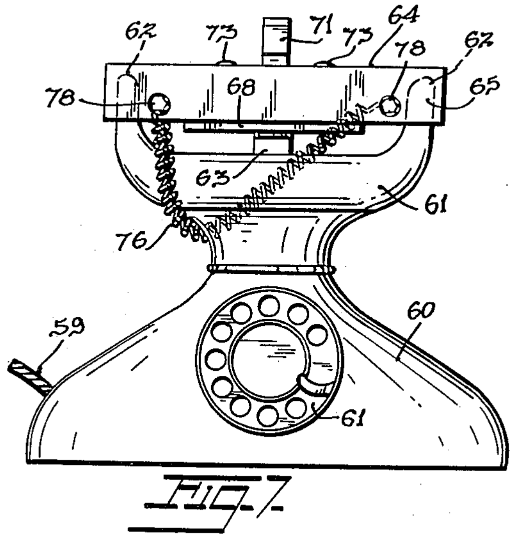
Fig. 7 is a front elevation of a telephone base-set of a familiar kind, equipped with the aforesaid means for manually controlling the switch in said base-set, the aforesaid cam member being shown in its position for opening the telephone line.
Figure 8:
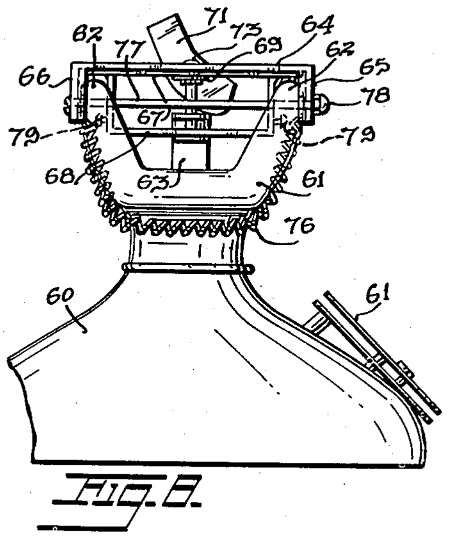
Fig. 8 shows said base-set and its said equipment, looking toward the right in Fig. 7, and with said cam member also in position for opening the telephone line.
Figure 9:
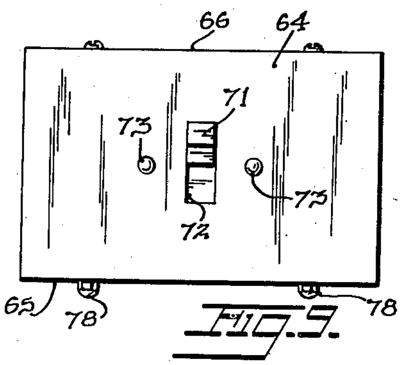
Fig. 9 is a top plan view of said means, detached, and with said cam member as in Figs. 7 and 8.
Figure 10:
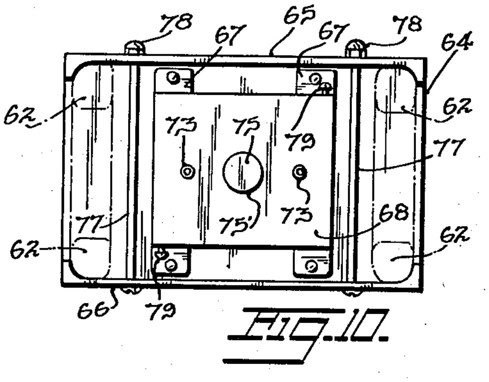
Fig. 10 is a bottom plan view thereof, with certain cradle parts of the receiver indicated in dot and dash lines.
Figures 12, 13:
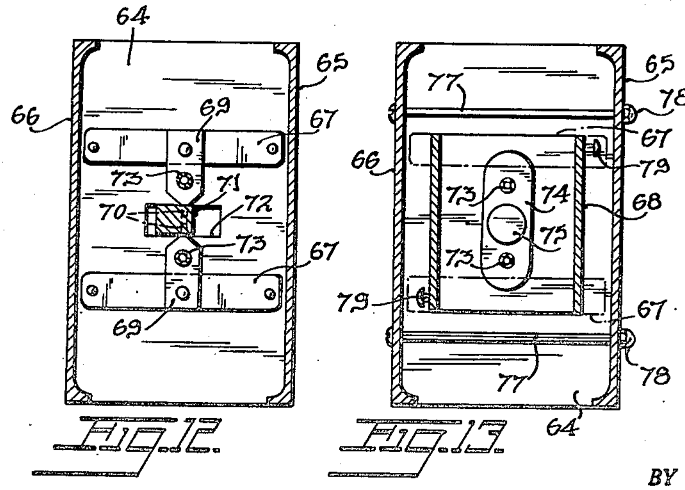
Fig. 12 is a horizontal section, taken on the line 12—12 of Fig. 11.
Fig. 13 is a horizontal section, taken on the line 13—13 of Fig. 11.

Referring to Figs. 7–13, where a complementary part of said wiring is seen also at 59 in Fig. 7, the base-set 60 shown is one of a familiar type, including a dialing mechanism 61, and carrying at its top a roofed over hollow structure having four upstanding horns 62 forming a cradle for the hand-set 30. A button 63, spring-urged to project upwardly as shown in Figs. 7–9, thereby to operate a switch to open the telephone line when the hand-set is removed from the cradle, and to close the telephone line when the hand-set is in the cradle.

The aforesaid means to be attached to such base-set is shown as incorporating a rectangular plate 64 having front and rear depending walls 65 and 66 each thickened at its ends as illustrated. Suitably fastened to the underside of the plate 64 are a pair of transverse strips 67. Suitably secured to the undersides of said strips is a box 68, open at both ends; the two vertical side walls of said box being upwardly extended, between the strips 67, for closely abutting the underside of the plate 64. Suitably secured to said strips 67 also, are a pair of auxiliary strips 69, these latter extending longitudinally of the plate 64 and aligned for endwise approach toward each other. At their adjacent ends, the strips 69 have reduced pintle-providing portions 70, such portions entered into an aperture through an actuator 71, constituting the aforesaid cam member, for journalling the same on the plate 64, to permit said member to be manually positioned, relative to a slot 72 through the plate 64, as shown in Figs. 7–9, or as shown in Fig. 11.

A pair of vertical tubular rivets 73 serve further to couple the plate 64 and the box 68, and also, these rivets passing through the strips 69, to aid in locking the latter in place. Rivets 73, furthermore, serve as guiding means for a bar 74, loosely strung on the rivets, and rigidly carrying a button 75 projected down through a circular opening 75′ in the bottom of box 68.

Button 75 in in vertical registry with the top of the base-set's button 63, when the equipment now being described is secured in place as shown on the top of the structure 61 of the base-set, with the horns 62 fitted, as indicated in Fig. 8, into the four corner pockets afforded below the plate 64 at the inner sides of the walls 65 and 66 and alongside the end enlargements of the latter.

Said equipment is held in this position by means of a retractile coil spring 76 of a length such that it will be stretched somewhat when the eyes at its opposite ends are connected to said equipment, with the spring engaging the structure 61 as illustrated in Figs. 7 and 8. Said eyes may be connected as shown, to two transverse bolts 77 placed as illustrated and detachably secured by nuts 78. Or, whether or not said bolts and nuts are present, said eyes may be connected to two small posts 79 carried by the box 68.

The cam member 71 is shaped at its portion projected down through the slot 72 in such manner that, when said member is thrown to the position shown in Fig. 11, the bottom of the member 71 is so disposed on top of the bar 74 that said member is dead-center-locked in position by the spring-urged tendency of the base-set's button 63 to bias upwardly, thus maintaining the telephone line closed. However, on throwing the member 71 to the position shown in Figs. 7–9, said button 63 rises, to open the telephone line, and dispose the other parts as shown in Figs. 7–9. The lower portion of said member 71, at the back thereof, is curvilinear, making it easy to gently depress the bar 74 and the button 75 when said member 71 is moved from its position shown in Fig. 8 to its position shown in Fig. 11.

Figure 14:
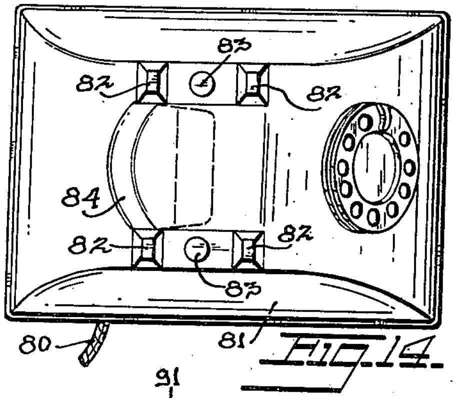
Fig. 14 is a top plan view of a different and very late model telephone base-set.
Figure 15:
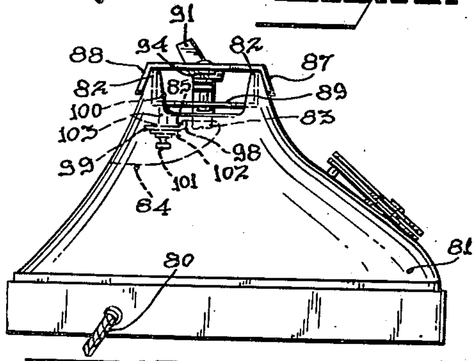
Fig. 15 shows said receiver in side elevation, and, attached thereto, an appropriately modified embodiment of the aforesaid means for manually controlling the switch in the base-set; the aforesaid cam member being here shown in its position for normally opening the telephone line.
Figure 18:
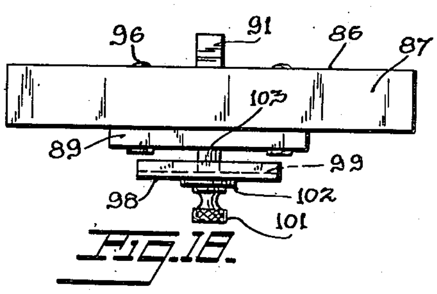
Fig. 18 is a side elevation of said means, looking toward the right in Fig. 17.

In Figs. 14 and 15, the very modern form of telephone base-set here illustrated, and having extended therefrom a wiring 80 corresponding to the wiring 59 of Figs. 2 and 7, is as a whole marked 81. This base-set, having an upper structure incorporating four horns 82 to provide a cradle for the hand-set 30, is characterized by the provision of two switch buttons 83, in lieu of, but similar in function and operation to, the button 63 of the base-set 60, and by having a recess 84 opening from the back of the upper structure of the base-set, such opening being in rear of the cradle, and said recess extending forwardly into the base-set between the side portions thereof carrying said buttons 83. The roof of the recess 84, across the width thereof, is stepped, to provide a short riser 85.

The aforesaid means to be attached to such base-set is shown as incorporating a rectangular plate 86 having front and rear depending walls 87 and 88, both downwardly outwardly inclined, in agreement with the downward frontal flarings of the front pair of horns 82 and with the downward and rearward flarings of the rear pair of horns 82; so that the member 86—88 may be snugly engaged with said horns in a fore and aft direction on the receiver 81 as illustrated.

Suitably secured to the underside of the plate 86 is a box 89, open at both ends.

Rockably mounted in a slot 90 through the plate 86 is an actuator 91, constituting the cam member aforesaid; such member pivotally mounted in said slot by a pair of pins 92, suitably mounted, and here shown as nested in aligned grooves 93 in the underside of the plate 86 at opposie sides of said slot, and held in place by the large annular flanges 94 at the tops of vertical tubular rivets 95 extended down through the bottom of the box 68. Through the plate 86 and the interiors of the rivets 95 are extended solid rivets 96; the bottoms of all the rivets being upset below the bottom of the box 89.

Figure 17:
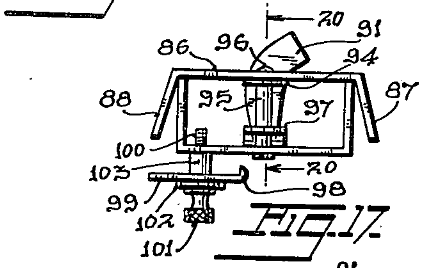
Fig. 17 is an end elevation of said means, detached and viewed as in Fig. 15, but with said cam member now positioned to close the telephone line.
Figure 19:
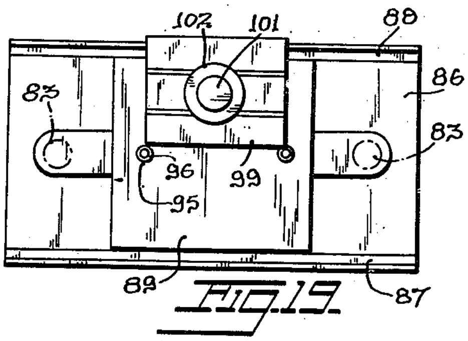
Fig. 19 is a bottom plan view of said means.
Figure 20:
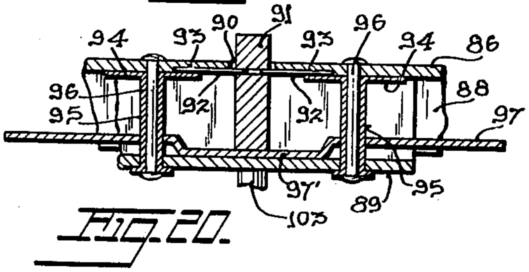
Fig. 20 is a fragmentary vertical section, taken on the line 20—20 of Fig. 17.
Figures 21, 22, 23, 24, 25:
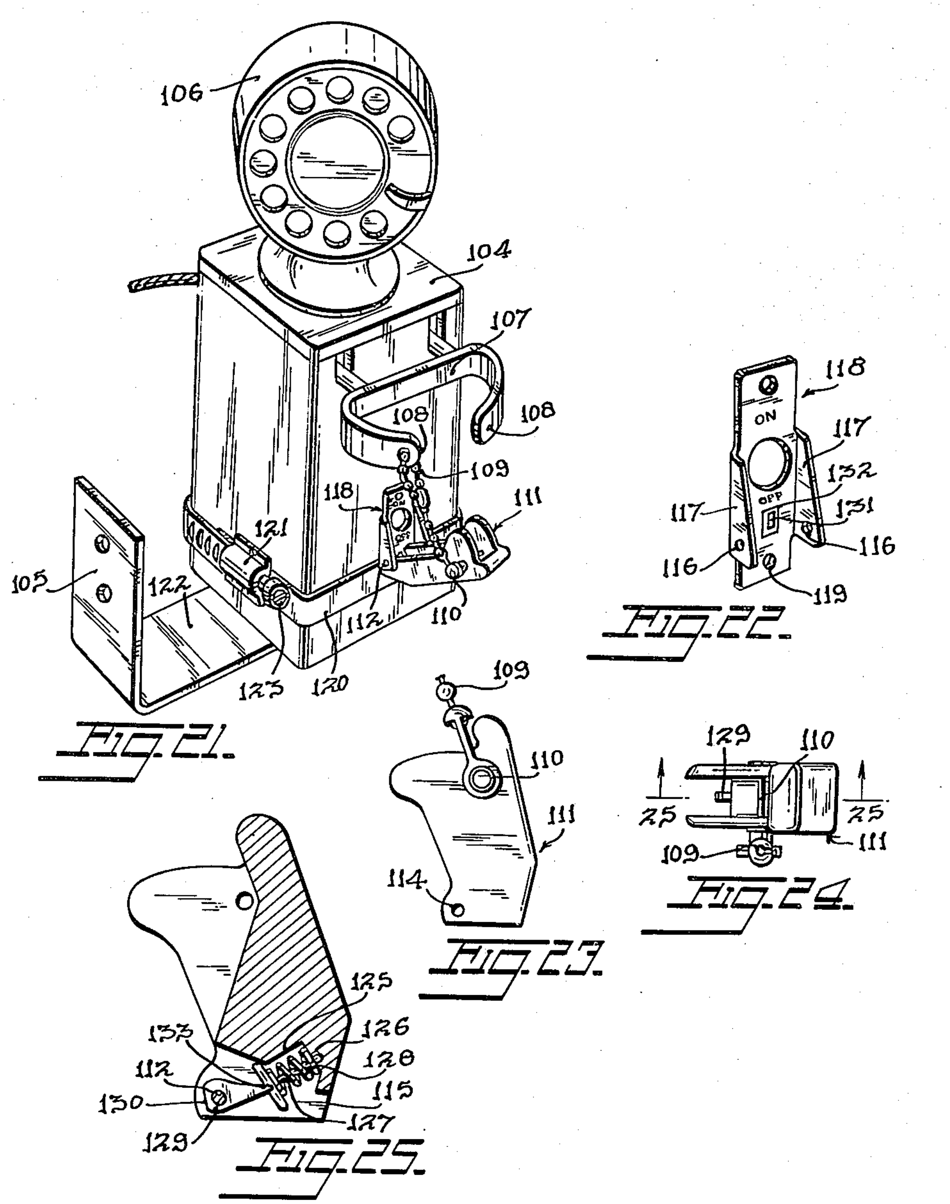
Fig. 21 is a perspective view, showing another type of telephone base-set sometimes encountered, equipped with an appropriately modified embodiment of the aforesaid means for manually controlling the switch in the base-set; the aforesaid cam member being shown in its position for allowing the telephone line to close.
Fig. 22 is a perspective view, showing a bracket.
Fig. 23 is a side elevation of the cam member.
Fig. 24 is a top plan view thereof.
Fig. 25 is a vertical section, taken on the line 25—25 of Fig. 24.

Loosely strung on the main lengths of the tubular rivets 95 is a long bar 97 having a centrally downwardly dipped somewhat U-shaped portion 97′. The parts are so shaped and arranged that when the cam member 91 is arranged as in Figs. 17 and 20, with the bottom of said portion 97′ against the upper side of the bottom of the box 89, the end portions of the bar 97 hold down the base-set's buttons 83, thereby to maintain the telephone line closed; and so that, when said member 91 is thrown to its position shown in Fig. 15, said buttons 83 are freed to rise to open the telephone line.

Figure 16:
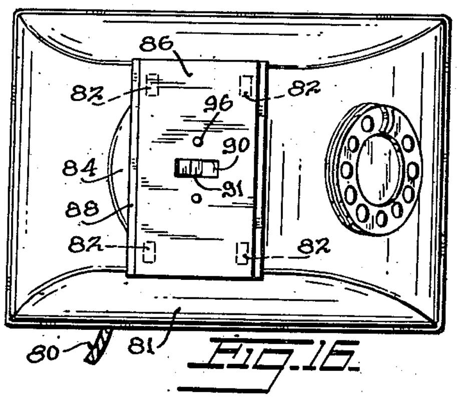
Fig. 16 is a top plan view, showing said base-set and said means.

When the means now being described is laterally symmetrically disposed relative to the cradle at the top of the base-set 81, as shown in Fig. 16, the end portions of the bar 97 overlie the base-set's buttons 83. Said means is thus secured, by engaging an upwardly extended hook portion 98 of a plate 99, with the riser 85 in the base-set's recess 84; said plate being carried by a screw 100, coacting with a tapped hole through the bottom of the box 89 and having a head 101 above which and below the plate 99 is a washer 102. On the screw 100, between said box and the plate 99, is a sleeve 103, of a length such that when the screw is tightened, the device now being described is locked fast on the base-set.

The cam member 91, in conformation and action, is in accordance with the cam member 71 of Figs. 7–13 as hereinabove explained.

In Figs. 21–25 is shown a commonly used telephone base-set 104 in the form of a vertically elongated rectangular box, equipped with a bracket 105 for attachment, for example, to a desk side, and carrying at its top a dialing mechanism 106. At a side of said box is an opening 107, through which is extended a pair of hooks 108 forming part of a lever mechanism pivoted inside the box. Said hooks have outer enlarged and apertured ends, providing a cradle for ordinarily having suspended therefrom in the familiar way the hand-set 30. A switch inside the box is so arranged that the weight of the thus suspended hand-set closes the telephone line, but such line is opened when the hand-set is lifted away.

In the illustrated adaptation of the invention to this type of base-set, the upper end of a chain 109 is connected to the aperture at the outer end of one of hooks 108, and the lower end of such chain is connected at 110 to an actuator 111, constituting the cam member aforesaid. Said member 111 is pivoted on a pin 112 engaging a pair of aligned apertures 114 through the lower side wall portions of the member 111 at opposite sides of a bottom recess 115 therein, said pin also engaging a pair of aligned apertures 116 through the side wings 117 of a bracket 118.

Figure 6:
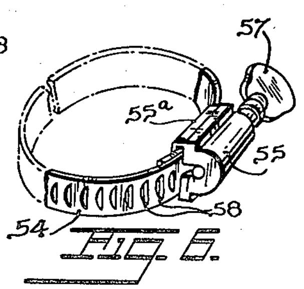
Fig. 6 is a detail view in perspective of a strap-clasp for directly engaging the telephone hand-set.

The bracket 118 by means of a rivet 119 is fixed on a flexible metal strip 120 forming with a housing 121 the same familiar type of tightenable strap already described in connection with Fig. 6. The strip 120, it will be noted, has apertures 122 corresponding to the apertures 58, and in the housing 121 is a screw corresponding to the screw 56, said screw having a kerfed head 123 in an extension 124 from the housing 121. By means of said screw, the strip 120 may be drawn up to form a strap tightly embracing the base-set 104.

The cam member 111, which has been satisfactorily made by molding the same from a plastic, is provided also with a secondary upwardly rearwardly inclined recess 125 having at its inner end a centrally reduced portion 126 for receiving the upper end of a headed pin 127 sleeved above said head by a strong expansile coil spring 128. Fixed on the pin 112 is a shaped piece 129 having a flat 130 fitted in a rectangular indentation 131 in a block 132 suitably fixed to the bracket 118.

Whether the cam member 111 is arranged as shown, to allow the hooks 108 to rise and open the telephone line, or is swung down through approximately 90° until the flat bottoms of the side wall portions on opposite sides of the recess 115 engage the strip 120, to pull on the hooks 108 to swing them down to close the telephone line, the finger-like projection 133 of the piece 129 remains in a central depression in the outer face of the head of the pin 127; this continued coupling of the parts 133 and 127 resulting from the fact that the pin 127 and its spring 128 are rockable in the recess 125. The arrangement of the parts is such that, whether the cam member 111 is arranged as shown, or is swung down as last described, there is an action typical of that in a so-called toggle switch, with the spring 128 acting to strongly resiliently hold the cam member 111 in that one of its two positions to which it is thrown.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A telephone base-set attachment comprising a rectangular plate portion having depending side walls for slidably engaging hook portions of said base-set, a cam member pivoted in said rectangular portion, a box member having a plurality of holes therein mounted on the underside of said rectangular plate portion by suitable rivets extending therethrough, an elongated plate member having a plurality of holes therein slidably mounted on said rivets between said rectangular plate portion and said box member, whereby an upwardly biased switch in said base-set extends vertically through said box member to resiliently maintain said elongated plate member in contact with said cam member, and means cooperating with said box member and said base-set for holding the attachment in place on said base-set.

2. A telephone base-set attachment comprising a rectangular plate portion having depending side walls for slidably engaging hook portions of said base-set, a cam member pivoted in said rectangular portion, a box member having a plurality of holes therein mounted on the underside of said rectangular plate portion by suitable rivets extending therethrough, an elongated plate member having a plurality of holes therein slidably mounted on said rivets between said rectangular plate portion and said box member, whereby an upwardly biased switch in said base-set extends vertically through said box member to resiliently maintain said elongated plate member in contact with said cam member, and means cooperating with said box member and said base-set for holding the attachment in place on said base-set, wherein said upwardly biased switch bears against said elongated plate member at a central point thereof.

3. A telephone base-set attachment comprising a rectangular plate portion having depending side walls for slidably engaging hook portions of said base-set, a cam member pivoted in said rectangular portion, a box member having a plurality of holes therein mounted on the underside of said rectangular plate portion by suitable rivets extending therethrough, an elongated plate member having a plurality of holes therein slidably mounted on said rivets between said rectangular plate portion and said box member, whereby an upwardly biased switch in said base-set extends vertically through said box member to resiliently maintain said elongated plate member in contact with said cam member, and means cooperating with said box member and said base-set for holding the attachment in place on said base-set, wherein said means is a tension spring underlying a portion of said hooked portions and is attached to said box member.

ARTHUR GOMES PINTO.

No references cited.